United States Patent
Lee et al.

(10) Patent No.: US 7,433,289 B2
(45) Date of Patent: Oct. 7, 2008

(54) FREQUENCY DETECTION METHOD FOR OPTICAL DISC BIT DATA REPRODUCTION APPARATUS

(75) Inventors: Eun Pyo Lee, Gwacheon (KR); Gun Jae Koo, Yongin (KR)

(73) Assignee: LG Electronics Inc., Seoul (KR)

( * ) Notice: Subject to any disclaimer, the term of this patent is extended or adjusted under 35 U.S.C. 154(b) by 591 days.

(21) Appl. No.: 11/055,291

(22) Filed: Feb. 9, 2005

(65) Prior Publication Data

US 2005/0270937 A1 Dec. 8, 2005

(30) Foreign Application Priority Data

Feb. 11, 2004 (KR) .................... 10-2004-0009031

(51) Int. Cl.
*G11B 7/00* (2006.01)
(52) U.S. Cl. .............. 369/59.23; 369/59.22; 369/47.26; 369/47.35; 369/47.18
(58) Field of Classification Search ............. 369/59.22, 369/59.23, 59.17, 59.16, 47.18, 47.26, 47.35
See application file for complete search history.

(56) References Cited

U.S. PATENT DOCUMENTS 5,986,990 A * 11/1999 Moon ..................... 369/59.16

* cited by examiner

*Primary Examiner*—Jorge L Ortiz Criado
(74) *Attorney, Agent, or Firm*—Lee, Hong, Degerman, Kang & Schmadeka

(57) ABSTRACT

The present invention relates to a frequency detection method for an optical disc bit data reproduction apparatus. The frequency detection method uses the optical disc bit data reproduction apparatus including an Analog to Digital Converter (ADC), an interpolator, an asymmetry compensator, a digital bit and successive bit length detector, a frequency detector, a phase detector and a Digital Controlled Oscillator (DCO). In the frequency detection method includes the primary frequency detection step and the secondary frequency detection step. In the primary frequency detection step, status of input RF digital bit data frequency versus sampling frequency is determined and the sampling frequency is corrected so as to allow the sampling frequency to be rapidly adjusted to the frequency of the RF digital bit data, thus primarily detecting frequency. In the secondary frequency detection step, the sampling frequency is more precisely adjusted to the frequency of the RF digital bit data if the sampling frequency is adjusted to the frequency of the RF digital bit data within a predetermined range at the primary frequency detection step, thus secondarily detecting frequency.

10 Claims, 6 Drawing Sheets

(a)

(b)

FREQUENCY DETECTION METHOD FOR OPTICAL DISC BIT DATA REPRODUCTION APPARATUS

CROSS-REFERENCE TO RELATED APPLICATIONS

Pursuant to 35 U.S.C. §119(a), this application claims the benefit of earlier filing date and right of priority to Korean Application No. 10-2004-0009031, filed on Feb. 11, 2004, the contents of which are hereby incorporated by reference herein in its entirety.

BACKGROUND OF THE INVENTION

1. Field of the Invention

The present invention relates, in general, to a bit data reproduction apparatus for an optical disc playback system, such as a compact disc player or a digital versatile disc player and, more particularly, to a frequency detection method for an optical disc bit data reproduction apparatus, which rapidly detects the frequency of input data, required for data bit reproduction, from radio frequency analog data that are input to a reception unit of an optical disc playback system having various read speeds.

2. Description of the Related Art

Bits of digital information, that is, 0 and 1, are recorded on the surface of an optical disc, such as a Compact Disc (CD) or Digital Versatile Disc (DVD). Bit information indicated by 0 and bit information indicated by 1 differ from each other in reflexibility of light. An optical disc pickup generates a Radio Frequency (RF) analog waveform shown in FIG. 1 using amounts of laser light, reflected from an optical disc, that correspond to bit values of 0 or 1. A reception unit of an optical disc playback system reproduces digital bit information recorded on a disc by sampling the RF analog waveform. In this case, the frequency and phase information of data input to the reception unit is required, and the reception unit detects the frequency and phase using the input RF waveform. In order to accurately reproduce digital data in an optical disc playback system having various data input frequencies, it is important to rapidly and accurately detect frequency and phase.

For a method of detecting frequency information from a CD or DVD, methods using a sync code are frequently used. In a CD and DVD, a specific sync code for identifying predefined data bit units exists. If a time period corresponding to one bit is 1T, a CD and a DVD are used by identifying a signal having a length that is equal to two successive lengths of 11T and a signal having a length of 14T, as sync codes, respectively. A frequently used conventional method to detect the frequency of input data is to compare the length of a sampled sync code with the length of a sync code, obtained when sampling is performed at a correct frequency, and to determine whether a current sampling frequency is high or low. That is, a sync code has a greater code length than typical data codes of a CD or DVD which have limited code lengths, such as a minimum length of 3T and a maximum length of 11T. Therefore, the sync code is first detected and the length of a sampled sync code is then stored. In the case of a DVD, if the length of the sampled sync code is greater than 14T, a current sampling frequency is higher than the frequency of input data. In contrast, if the length of the sampled sync code is less than 14T, a current sampling frequency is lower than the frequency of input data. Therefore, such a frequency error is corrected, thus detecting an accurate input frequency.

However, this method is disadvantageous in that, if defects, such as scratches or fingerprints, exist on the surface of an optical disc, or if data recorded on the optical disc are not clear, it is possible to miscalculate the length of a sync code and detect an erroneous current sampling frequency, so that the frequency of input data may not be correctly detected. Therefore, it is necessary to detect an accurate sync code and sample the sync code. In this case, there is problem in that, in order to detect an accurate sync code when an input frequency deviates considerably from a sampling frequency, a certain period of time is required, thus increasing the time required to detect an input frequency.

Further, Korean Pat. Laid-Open Publication No. 1998-020547 discloses a method of decreasing a sampling frequency when a signal having a length less than 3T, such as 1T or 2T, is detected, and increasing a sampling frequency when a signal having a length greater than 11T is detected. This patent discloses a method of correcting a frequency when data having a length exceeding limit lengths are detected, using the characteristics of optical disc bit data limiting a minimum successive length and a maximum successive length of bit data to 3T and 11T, respectively. This method is problematic in that an input frequency cannot be rapidly and stably detected, for example, the time during which a frequency detector adjusts a sampling frequency is not uniform according to the status and type of an optical disc and the frequency of input data, and frequency may not be satisfactorily adjusted according to a gain value and may not be correctly detected when scratches exist on the surface of a disc.

SUMMARY OF THE INVENTION

Accordingly, the present invention has been made keeping in mind the above problems occurring in the prior art, and an object of the present invention is to provide a frequency detection method for an optical disc bit data reproduction apparatus, which rapidly and accurately detects the frequency of input data required to reproduce digital data from RF analog data input to a reception unit of an optical disc playback system.

In order to accomplish the above object, the present invention provides a frequency detection method for an optical disc bit data reproduction apparatus, the frequency detection method sampling an RF analog signal, detected and input from an optical disc, and converting the RF analog signal into RF digital data, determining sampled RF digital data by the interpolation of the RF digital data using the frequency and phase information of digital bit data, adjusting the input level of the sampled digital data and outputting corrected RF digital data, and detecting the frequency of RF digital bit data used for the interpolation at the time of detecting digital bit data on the basis of the corrected RF digital data, through the use of the optical disc bit data reproduction apparatus including an Analog to Digital Converter (ADC), an interpolator, an asymmetry compensator, a digital bit and successive bit length detector, a frequency detector, a phase detector and a Digital Controlled Oscillator (DCO), the method comprising the primary frequency detection step of determining status of input RF digital bit data frequency versus sampling frequency and correcting the sampling frequency so as to allow the sampling frequency to be rapidly adjusted to the frequency of the RF digital bit data, thus primarily detecting frequency, and the secondary frequency detection step of more precisely adjusting the sampling frequency to the frequency of the RF digital bit data if the sampling frequency is adjusted to the frequency of the RF digital bit data within a predetermined range at the primary frequency detection step, thus secondarily detecting frequency.

DESCRIPTION OF THE PREFERRED EMBODIMENTS

Hereinafter, embodiments of the present invention will be described in detail with reference to the attached drawings.

Figure 1:
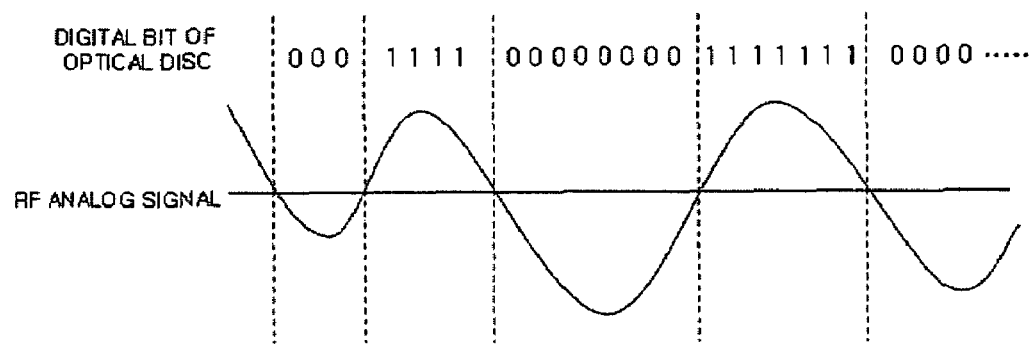
FIG. 1 is a view showing digital bit data and RF analog signals recorded on an optical disc.
Figure 2:
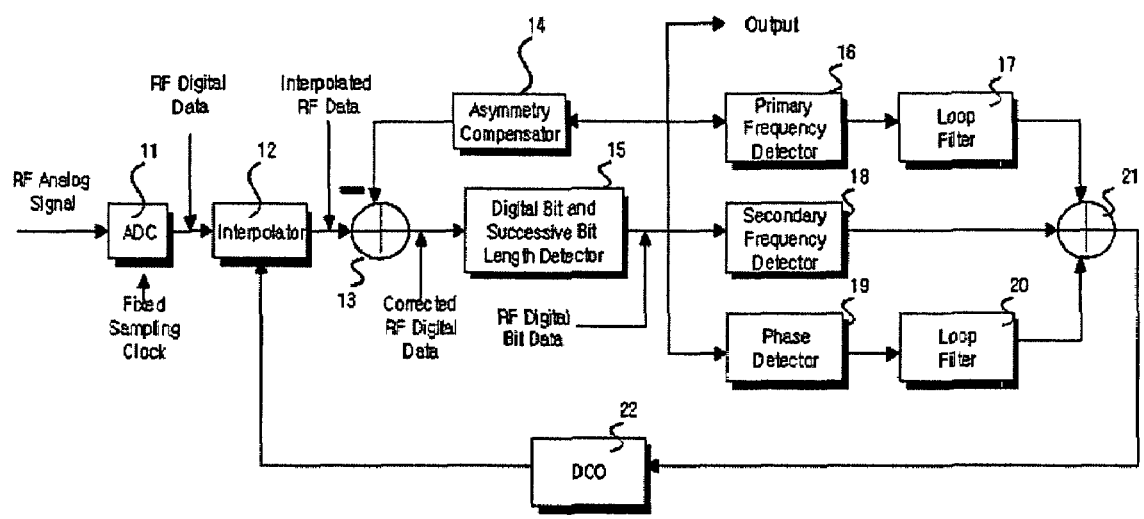
FIG. 2 is a block diagram of an optical disc bit data reproduction apparatus to which a frequency detection method of the present invention is applied.
Figure 3:
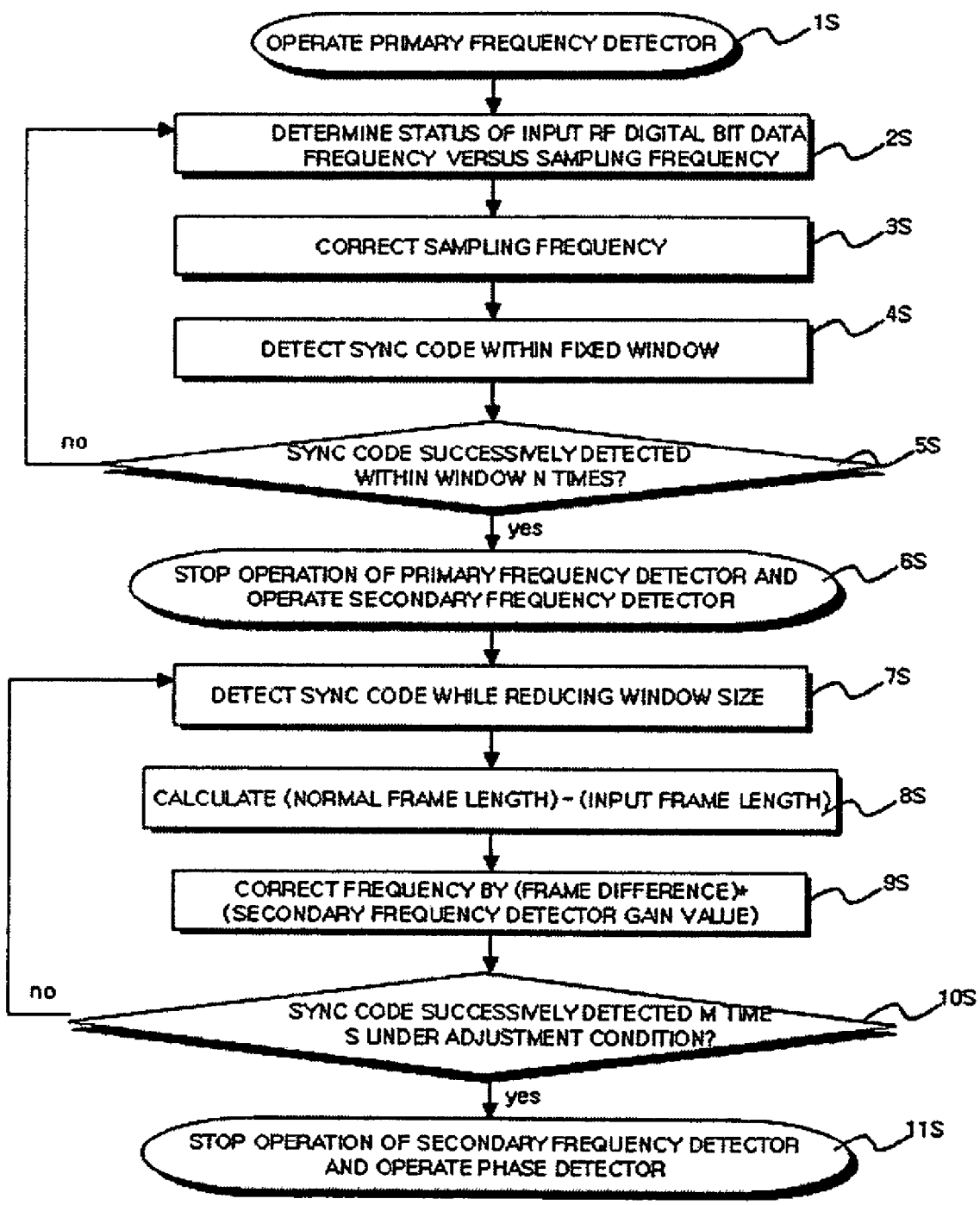
FIG. 3 is a flowchart showing the operation and control process of the frequency detection method.

FIG. 2 is a block diagram of an optical disc bit data reproduction apparatus for reproducing optical disc bit data using the frequency detection method of the present invention, and FIG. 3 is a flowchart showing the operation and control process of the frequency detection method of the present invention.

As shown in FIG. 2, the optical disc bit data reproduction apparatus includes an Analog to Digital Converter (ADC) 11, an interpolator 12, a subtracter 13, a digital bit and successive bit length detector 15, an asymmetry compensator 14, a primary frequency detector 16, a loop filter 17, a secondary frequency detector 18, a phase detector 19, a loop filter 20, an adder 21, and a Digital Controlled Oscillator (DCO). The ADC samples an RF analog signal detected from an optical disc using a fixed sampling clock signal, encodes the sampled signal into a binary code format, and converts the encoded signal into RF digital data. The interpolator 12 determines a sampling signal according to the frequency and phase information of RF digital bit data output from the DCO 22, and then outputs interpolated RF analog-digital data. The subtracter 13 subtracts the output of the asymmetry compensator 14 from the interpolated RF digital data that are output from the interpolator 12, and then outputs corrected RF digital data. The digital bit and successive bit length detector 15 determines RF digital bit data on the basis of the corrected RF digital data, outputs the determined RF digital bit data to the outside of the system, and detects the length of successive bits of the determined RF digital bit data. The asymmetry compensator 14 receives the RF digital bit data, adjusts the input level of digital data, and outputs the input level-adjusted digital data to the subtracter 13. The primary frequency detector 16 receives the RF digital bit data, determines the status of RF digital bit data frequency versus sampling frequency, and primarily detects a frequency so as to allow the sampling frequency to be primarily and rapidly adjusted to the frequency of the RF digital bit data. The loop filter 17 filters the output of the primary frequency detector 16 to stably perform frequency correction. The secondary frequency detector 18 detects RF digital bit data more precisely than the primary frequency detection when a predetermined adjustment speed is reached. The phase detector 19 receives the RF digital bit data and detects the phase of the digital bit data. The loop filter 20 stabilizes phase correction performed by the phase detector 19. The adder 21 adds the outputs of the loop filter 17, the secondary frequency detector 18 and the loop filter 20 to each other. The DCO 22 receives the output of the adder 21, generates the frequency and phase information of the RF digital bit data, and outputs the frequency and phase information to the interpolator 12.

The optical disc bit data reproduction apparatus employs an All-Digital Phase-Locked Loop (ADPLL) structure, but the present invention is not limited to this structure and can employ a structure utilizing a Voltage Controlled Oscillator (VCO) that generates a clock signal according to a phase, applying the clock signal generated by the VCO to an ADC, and then directly sampling an RF analog signal using the clock signal.

Hereinafter, the frequency detection method of the present invention using the optical disc bit data reproduction apparatus of FIG. 2 is described in detail with reference to the attached drawings.

As shown in FIG. 2, in the above-described optical disc bit data reproduction apparatus, the ADC 11 samples the RF analog signal, detected and input from an optical disc, encodes the sampled RF analog signal into a binary code format and then converts the RF analog signal into RF digital data. Thereafter, the interpolator 12 interpolates the RF digital data using the frequency and phase information of the RF digital bit data that are input from the DCO 22, and determines sampled RF digital data. The input level of the sampled RF digital data is corrected by the output of the asymmetry compensator 14. Digital bits and the length of successive bits are detected on the basis of the corrected RF digital data, so that the digital bit data are provided to the outside of the system.

In this case, the frequency detection method of the present invention is executed by the primary frequency detector 16, the loop filter 17 and the secondary frequency detector 18. That is, if the RF digital bit data are output from the digital bit and successive bit length detector 15, the primary frequency detector 16 is operated at step 1S, and then determines the status of input RF digital bit data frequency versus sampling frequency at step 2S, as shown in FIG. 3.

Figure 4:
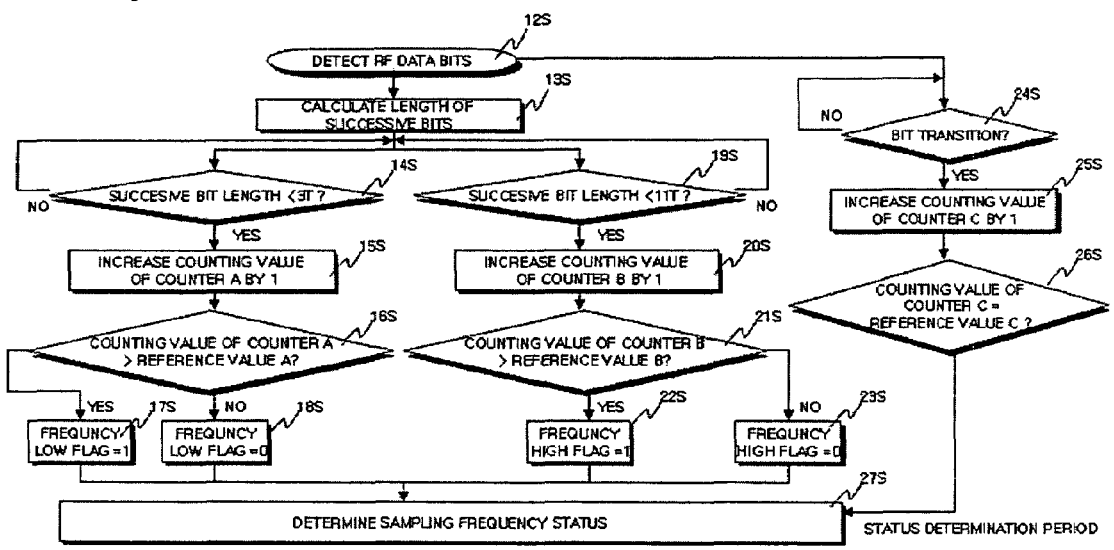
FIG. 4 is a flowchart of a process of determining the status of input RF digital bit data frequency versus sampling frequency.

The process of determining the status of input RF digital bit data frequency versus sampling frequency is described in detail. As shown in the flowchart of FIG. 4, the primary frequency detector 16 detects locations where bit transitions from 0 to 1 or from 1 to 0 occur in the RF digital bit data that are input from the digital bit and successive bit length detector 15 at step 12S, and calculates the length of successive bits on the basis of the bit transitions at step 13S. Next, it is determined whether the length of successive bits is not greater than 3T (1T is the length of one bit) at step 14S. If the length of successive bits is less than 3T, the counting value of a counter A, which is a low counter, is increased by 1 at step 15S. It is determined whether the counting value of the counter A is greater than a reference value A at step 16S. If the counting value of the counter A is not greater than the reference value A, a frequency low flag is set to 0 at step 17S, while if the counting value of the counter A is greater than the reference value A, the frequency low flag is set to 1 at step 18S.

In this case, the length of successive bits used in the present invention is described in detail. FIGS. 5a and 5b are graphs showing the distribution of the lengths of successive, identical bit data among the data recorded on the surfaces of a CD and a DVD, respectively. The length of successive, identical bit data is defined as a successive bit length. For example, if data recorded on an optical disc is 100011110,000 is data having a successive bit length of 3T, and 1111 is data having a successive bit length of 4T. Referring to FIGS. 5a and 5b, the minimum successive bit length and maximum successive bit length of the data recorded on a CD are limited to 3T and 11T, respectively. Further, it can be seen that a DVD has a distribution similar to that of the CD except that data having a successive bit length of 14T distinguished by sync codes exist. FIGS. 5a and 5b illustrate the successive bit lengths distributed on the basis of modulated data to allow the data to be recorded on the surface of the CD and the DVD. Further, the distribution of FIGS. 5a and 5b is obtained even when input data are sampled according to the frequency and phase of input digital bit data to reproduce bit data in a read channel.

Referring to FIG. 4, it is determined whether the length of successive bits is greater than 11T at step 19S. If the length of successive bits is greater than 11T, the counting value of a counter B is increased by 1 at step 20S. Thereafter, it is determined whether the counting value of the counter B is greater than a reference value B at step 21S. If the counting value of the counter B is greater than the reference value B, a frequency high flag is set to 1 at step 22S, while if the counting value of the counter B is not greater than the reference value B, the frequency high flag is set to 0 at step 23S.

Figure 6:
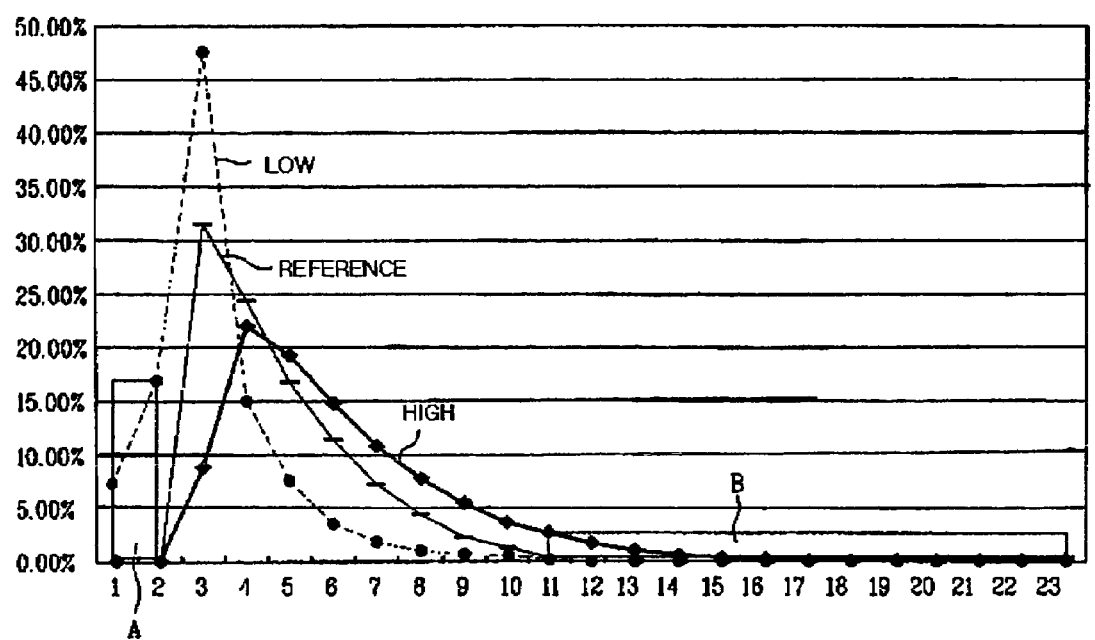
FIG. 6 is a graph showing variations in distribution charts caused by the difference between a sampling frequency and an input data frequency.

In this case, the reason for extracting data having a successive bit length less than 3T and greater than 11T and determining the status of input RF digital bit data frequency versus sampling frequency is described below. FIG. 6 is a graph showing the relationship between the distribution of successive bit lengths and sampling frequencies in a read channel. FIG. 6 shows that, if a sampling frequency is higher than the frequency of input RF digital bit data, a distribution curve shifts to a right side of the graph and the data are distributed toward having a longer successive bit length, while if the sampling frequency is lower than the frequency of input RF digital bit data, a distribution curve shifts to a left side of the graph and the data are distributed toward having a shorter successive bit length. Since the distribution of successive bit lengths and sampling frequencies have the above relationship, the status of input RF digital bit data frequency versus sampling frequency can be known by examining the distribution of successive bit lengths in a read channel. However, data recorded on a CD and a DVD are basically limited to have a minimum successive bit length of 3T and a maximum successive bit length of 11T (except for a sync code of a DVD). Therefore, the status of input RF digital bit data frequency versus sampling frequency can be known using the number of pieces of data having a successive bit length less than 3T and data having a successive bit length greater than 11T as in portions A and B of FIG. 6, without examining the distribution of all successive bit lengths.

Referring again to FIG. 4, a bit transition is detected from RF digital bit data at step 24S, and the counting value of a counter C is increased by 1 whenever a bit transition is detected at step 25S. If the counting value of the counter C is equal to a reference value C at step 26S, it is determined that a frequency status determination period has come, so that the status of a sampling frequency is determined on the basis of values set to the flags at step 27S. At this time, if the flag A is 1 and the flag B is 0, the status of a sampling frequency is determined to be "low", while if the flag A is 0 and the flag B is 1, the status of a sampling frequency is determined to be "high". If both the flag A and flag B are 0, the status of a sampling frequency is determined to be a "normal" state in which the frequency of input RF digital bit data and the sampling frequency are similar to each other. Further, if both the flag A and flag B are 1, the status of a sampling frequency is determined to be an "abnormal" state in which great errors exist on the input RF digital bit data.

A method of correcting the sampling frequency using the status of input RF digital bit data frequency versus sampling frequency determined in this way is to adjust the sampling frequency as shown in Table 1.

TABLE 1

| Successive bit length | CD | DVD |
| --- | --- | --- |
| 1T, 2T | + | + |
| 3T~11T | 0 | 0 |
| 12T | − | +(low state), −(other cases) |
| 13T | − | −(high state), +(other cases) |
| 14T | −(high state), 0(other cases) | 0 |
| 15T~ | −(high state), 0(other cases) | − |

In Table 1, "+" means that, since the sampling frequency is currently in a low state, the sampling frequency is adjusted to a high state, "−" means that, since the sampling frequency is currently in a high state, the sampling frequency is adjusted to a low state, and "0" means that, since the sampling frequency is currently in a normal state, there is no need to adjust the sampling frequency. Further, "other cases" represents cases that may occur due to noise, dust, etc., in which the sampling frequency is adjusted as shown in Table 1. At this time, if the status of the sampling frequency is "low", a gain is adjusted to increase the sampling frequency, while if the status of the sampling frequency is "high", a gain is adjusted to decrease the sampling frequency.

Figure 5:
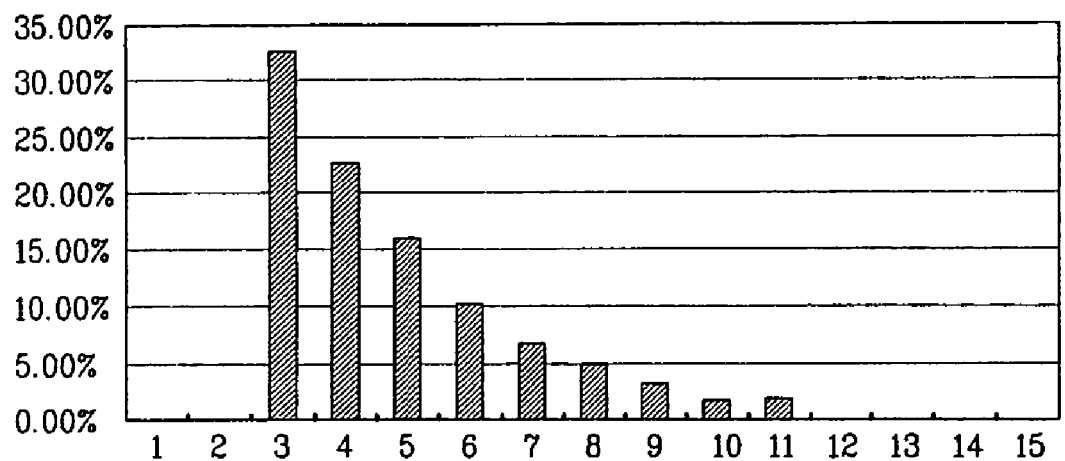
FIGS. 5a and 5b are graphs showing the distribution of the lengths of successive bits for a CD and a DVD at normal frequencies.
Figure 5:
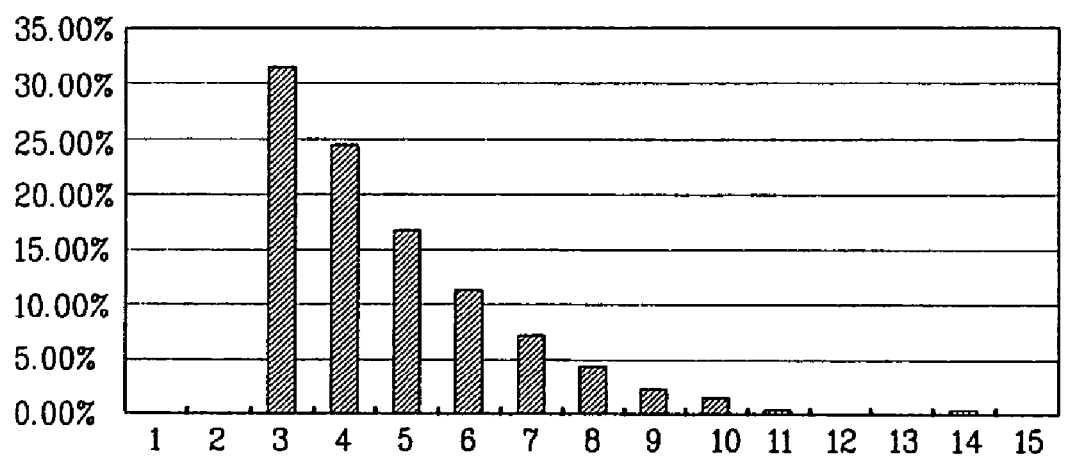

As described above, the sampling frequency is corrected using the calculated successive bit length. In this case, the correction is performed using the fact that a successive bit length is detected when the sampling frequency is different from the frequency of input RF digital bit data, as shown in FIGS. 5 and 6. That is, in the case of a CD, if a successive bit length less than 3T is detected, the sampling frequency is corrected to a high state, while if a successive bit length greater than 11T is detected, the sampling frequency is corrected to be low. Since a DVD differs from a CD in the normal distribution of successive bit lengths, a method of correcting a sampling frequency differs slightly from that of the CD. Methods of correcting a sampling frequency are differently set according to the status of the sampling frequency determined in FIG. 4, thus more rapidly and stably correcting the sampling frequency without causing errors. Further, the levels of correction values are differently set with respect to a positive frequency error and a negative frequency error according to the status of a sampling frequency, thus increasing the adjustment speed of the sampling frequency. That is, if the sampling frequency is higher than the frequency of input RF digital bit data, a gain value is adjusted to decrease the sampling frequency, while if the sampling frequency is lower than the frequency of input RF digital bit data, the gain value is adjusted to increase the sampling frequency, thus quickly adjusting the sampling frequency.

Figure 7:
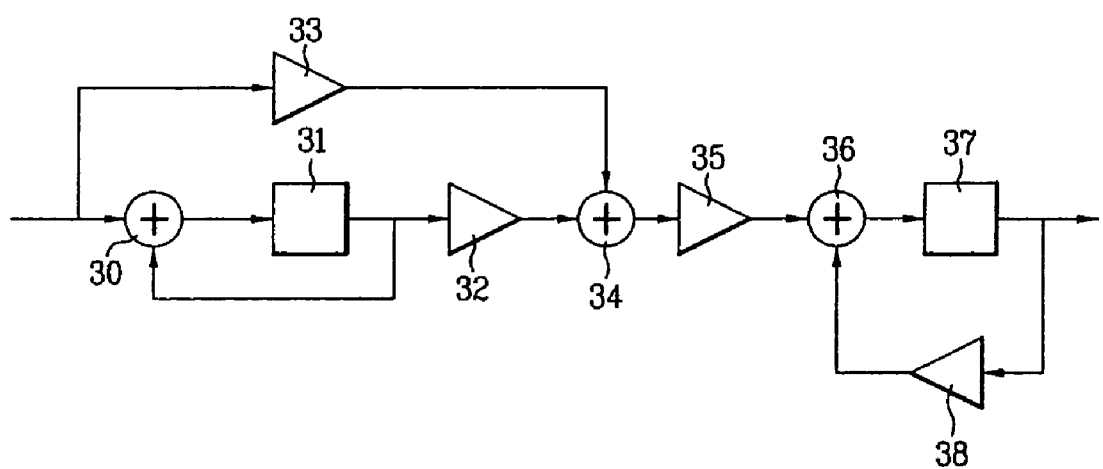
FIG. 7 is a block diagram of a loop filter using a primary frequency detector.

FIG. 7 is a block diagram of the loop filter 17 for passing lower frequency components of a frequency error, calculated by the primary frequency detector 16 to correct frequency, and stably transferring the passed results to a DOC (or VCO). In the present invention, the loop filter 17 is designed in a digital manner so as to simplify the structure thereof. As shown in FIG. 7, the loop filter 17 of the present invention includes first and second flip-flops 31 and 37 for delaying input data by one clock cycle, a first adder 30 for adding the output of the first flip-flop 31 to the input bit data, a first amplifier 32 for amplifying the input bit data by a predetermined gain, a second amplifier 33 for amplifying the output of the first flip-flop 31 by a predetermined gain, a second adder 34 for adding the output of the first amplifier 32 to the output of the second amplifier 33, a third amplifier 35 for amplifying the output of the second adder 34 by a predetermined gain, a fourth amplifier 38 for amplifying the output of the second flip-flop 37 by a predetermined gain, and a third adder 36 for adding the output of the third amplifier 35 to the output of the fourth amplifier 38.

The first and second flip-flops 31 and 37 function to delay respective input data by one clock cycle, and the first to fourth amplifiers 32, 33, 35 an 38 multiply input data by predetermined gains, respectively, and output multiplication results. These gains are expressed in the form of a square of 2, thus reducing the amount of hardware. A component part including the first adder 30, the first flip-flop 31, the first amplifier 32, the second amplifier 33 and the second adder 34 functions as a primary low pass filter, and a component part including the third amplifier 35, the third adder 36, the second flip-flop 37 and the fourth amplifier 38 functions to cancel overshoot effect of a value obtained after passing through the low pass filter, thus reducing the influence of jitter by correcting a frequency error. The sum of the gains of the third and fourth amplifiers 35 and 38 is always set to "1".

Referring to FIG. 3 again, after the sampling frequency is corrected at step 3S as described above, a sync code is detected within a fixed window at step 4S. Thereafter, it is repeatedly determined whether the sync code has been successively detected within the window N times until the sync code has been successively detected, for example, N times, at step 5S. If the sync code is successively detected within the window N times, the operation of the primary frequency detector is stopped, and then the secondary frequency detector is operated at step 6S.

The primary frequency detection at the above steps is adapted to allow the primary frequency detector to rapidly adjust the sampling frequency. In the case of a CD, data in which the sum of two successive bit lengths is equal to or greater than 2T is used as a sync code and then the frequency detection starts. In the case of a DVD, data in which a successive bit length is equal to or greater than 13T is used as a sync code and then the frequency detection starts. If the sampling frequency becomes similar to the frequency of input data to some degree, a sync code starts to uniformly appear within a detected window. If the sync code successively appears within the window N times in this way, it is determined that the primary frequency detector has adjusted the sampling frequency, so that the operation of the primary frequency detector is stopped, and the secondary frequency detector for more precisely adjusting the sampling frequency is operated to perform frequency detection.

That is, since the frequency detection method of the present invention cannot accurately detect frequency using only frequency detection performed by the primary frequency detector, the sampling frequency is detected using the secondary frequency detector capable of precisely detecting the sampling frequency so as to assist the phase detector to easily detect phase. The secondary frequency detector corrects the sampling frequency using the number of pieces of bit data between sync codes. In the case of a CD or a DVD, recorded data are divided on a frame basis. A special code for distinguishing these frames from each other is a sync code. A CD and a DVD have data bits, the lengths of which are 588T and 1488T, respectively, between sync codes.

If the sampling frequency is higher than the frequency of input data, the distance between sync codes is longer than a preset length, while if the sampling frequency is lower than the frequency of input data, the distance between sync codes is shorter than a preset length. If the secondary frequency detector adjusts the sampling frequency to some degree and the sync code is detected periodically, for example, N times, the operation of the primary frequency detector is stopped, and the sampling frequency is accurately detected using the secondary frequency detector.

As shown in FIG. 3, the operation of the secondary frequency detector is described. A sync code is detected while the size of the window is reduced at step 7S. Thereafter, the equation, (normal frame length)−(input frame length), is calculated at step 8S, and the frequency is then corrected by the equation, (frame difference)×(secondary frequency detector gain value), at step 9S. Next, the sync code is detected while the size of a detection window is successively reduced according to a frequency correction value until the sync code has been successively detected, for example, M times, under an adjustment condition at step 10S. In this way, the secondary frequency detector corrects the sampling frequency whenever the sync code is detected. Then, the length of bits between sync codes is counted, a suitable gain is multiplied by a difference between the counted length of bits and the normal length of bits, and the multiplication results are used to correct the sampling frequency. In this case, a risk of erroneously detecting a sync code is reduced by successively reducing the size of the detection window according to a frequency correction value. In the case of the secondary frequency detector, if the length of detected frames successively satisfies an adjustment condition M times, the operation of the secondary frequency detector is stopped, and the phase detector is operated to detect phase at step 11S. The primary frequency detector has a precision of, for example, less than 10%, while the secondary frequency detector can detect frequency with a precision of less than 1%.

As described above, the present invention provides a frequency detection method, which can determine the status of input RF digital bit data frequency versus sampling frequency using the input RF digital bit data and can use the status of input RF digital bit data frequency versus sampling frequency to detect the sampling frequency at the time of reproducing bit data recorded on an optical disc, such as a CD or DVD. Further, the present invention is advantageous in that it can increase the adjustment speed of frequency to detect a primary frequency within a predetermined adjustment range, and can more precisely and accurately detect a secondary frequency when an adjustment range has reached a predetermined range, thus rapidly, stably and accurately detecting the frequency of the input RF digital bit data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A frequency detection method for an optical disc bit data reproduction apparatus, the frequency detection method detecting a frequency of RF digital bit data used at the time of interpolation when digital bit data are detected from Radio Frequency (RF) signals used in an optical disc playback system, the method comprising:

a primary frequency detection step determining status of input RF digital bit data frequency with respect to sampling frequency and correcting the sampling frequency to the frequency of the RF digital bit data in order to primarily detect frequency;

a sync code detecting step detecting a sync code within a fixed window after the correction of the sampling frequency; and a secondary frequency detection step further correcting the sampling frequency using the number of pieces of bit data existing between sync codes, whenever sync codes are detected, if the sampling frequency is corrected to the frequency of the RF digital bit data within a predetermined range at the primary frequency detection step in order to secondarily detecting frequency, wherein the primary frequency detection step is performed such that the sampling frequency is corrected to be low if the sampling frequency is higher than the frequency of the input RF digital bit data and the sampling frequency is corrected to be high if the sampling frequency is lower than the frequency of the input data, thereby increasing a correction speed of the sampling frequency, and wherein the secondary frequency detection step is performed after the sync code has been successively detected within the window a specified number of times.

2. The frequency detection method according to claim 1, wherein the determination of the status of RF digital bit data frequency with respect to sampling frequency at the primary frequency detection step comprises:

a successive bit length calculation step detecting locations where bit transitions from 0 to 1 or from 1 to 0 occur in the input RF digital bit data in order to calculate a length of successive bits;

a flag setting step separately counting lengths of successive bits when a length of successive bits is greater than a first predetermined value and lengths of successive bits when a length of successive bits is less than a second predetermined value, comparing the separately counted successive bit lengths to separate reference values, and setting flags corresponding to the comparison; and a sampling frequency status determination step detecting the status of the flags at each status determination period of the RF digital bit data in order to determine the status of the sampling frequency.

3. The frequency detection method according to claim 2, wherein the flag setting step is performed so that first counter used to determine a low state of the sampling frequency is increased by 1 whenever the length of successive bits is less than 3T, a second counter used to determine a high state of the sampling frequency is increased by 1 whenever the length of successive bits is greater than 11T a frequency low flag is set to 0 or 1 to indicate whether the first counter is less than or greater than a first reference value, and a frequency high flag is set to 0 or 1 to indicate whether the second counter is less than or greater than a second reference value, wherein T is the length of one bit.

4. The frequency detection method according to claim 3, wherein the sampling frequency status determination step is performed such that:

the status of the sampling frequency is determined as a "low" state if the frequency low flag is 1 and the frequency high flag is 0;

the status of the sampling frequency is determined as a "high" state if the frequency low flag is 0 and the frequency high flag is 1, the status of the sampling frequency is determined as a "normal" state in which the frequency of input data is similar to the sampling frequency if both the frequency low flag and the frequency high flag are 0; and the status of the sampling frequency is determined as an "abnormal" state in which great errors exist in the input data if both the frequency low flag and the frequency high flag are 1.

5. The frequency detection method according to claim 3, wherein the status determination period is set such that it is determined whether a bit transition occurs on the RF digital bit data, a third counter is increased when the bit transition occurs, and the status determination period is set to a time when the third counter becomes equal to a third reference value.

6. The frequency detection method according to claim 2, wherein the status determination period is set that it is determined whether a bit transition occurs on the RF digital bit data, a third counter is increased when the bit transition occurs, and the status determination period is set to a time when the third counter becomes equal to a third reference value.

7. The frequency detection method according to claim 1, wherein the correction of the sampling frequency at the primary frequency detection step is performed using a loop filter for passing low frequency components of a frequency error therethrough.

8. The frequency detection method according to claim 7, wherein the loop filter comprises:

first and second flip-flops for delaying respective input data by one clock cycle;

a first adder for adding output of the first flip-flop to input bit data;

a first amplifier for amplifying the input bit data by a predetermined gain, and outputting the amplified input bit data;

a second amplifier for amplifying output of the first flip-flop by a predetermined gain and outputting the amplified output;

a second adder for adding outputs of the first and second amplifiers to each other;

a third amplifier for amplifying output of the second adder by a predetermined gain and outputting the amplified output;

a fourth amplifier for amplifying output of the second flip-flop by a predetermined gain and outputting the amplified output; and a third adder for adding outputs of the third and fourth amplifiers to each other.

9. The frequency detection method according to claim 8, wherein the third and fourth amplifiers are designed so that a sum of gains of the third and fourth amplifiers is always set to 1.

10. The frequency detection method according to claim 1, wherein the correction of the sampling frequency using the number of pieces of bit data comprises the steps of:

detecting a sync code while reducing a size of the window after the primary frequency detection step has terminated;

calculating a frame difference by subtracting an input frame length from a normal frame length;

correcting the sampling frequency by a value determined by multiplying the by a secondary frequency detector gain value; and sequentially and repeatedly determining whether the sync code has been successively detected a predetermined number of times under an adjustment condition until the sync code has been successively detected the predetermined number of times.

* * * * *